United States Patent Office 3,576,719
Patented Apr. 27, 1971

3,576,719
ALKALINE PROTEINASE
Sawao Murao, Osaka, Japan, assignor to E. R. Squibb & Sons, Inc., New York, N.Y.
No Drawing. Filed Apr. 23, 1968, Ser. No. 723,609
Int. Cl. C12d *13/10*
U.S. Cl. 195—62  2 Claims

ABSTRACT OF THE DISCLOSURE

This invention relates to a new alkaline proteinase produced by a strain of *Bacillus subtilis*. The new proteinase has a high activity optimum (pH 11.0) and also a high temperature tolerance. This material is obtained in solution in the extracellular fluid of a broth culture of the microorganism and may be isolated in crystalline form by relatively simple crystallization procedures. It is useful, for example, for disrupting protein bonds under a variety of conditions.

BRIEF SUMMARY OF THE INVENTION

This invention relates to a new alkaline proteinase produced by a strain of *Bacillus subtilis*. The new proteinase is unusual because of its high activity optimum (pH 11.0), and is unusual also in its high temperature tolerance; it retains substantially all of its activity after 10 minutes at 60–65° C. It is stable for 20 hours at 30° C. in the pH range 8.0–12.0, but is inactivated 50% at pH 7.0 at this temperature in this time. Further, it loses no measurable activity in pH 8.5 borate buffer in a day period at 5° C.

The enzyme has the amino acid composition shown in the table provided hereinafter. Its molecular weight, as determined by ultra centrifugation, is about 60,000.

The unusual stability of the enzyme and its activity at high temperature and pH levels makes it especially useful for removal of undesirable protein residues, as in the removal of proteinaceous soil from textile fabrics.

DETAILED DESCRIPTION OF THE INVENTION

A new alkaline proteinase and the method for producing this material from a strain of the microorganism *Bacillus subtilis* is the subject of this invention. The enzyme is produced by a hitherto unknown strain of *Bacillus subtilis* denominated var. SO–4 (SC 8548) conforming in general with the description of the species in Bergey's Manual. This organism has been deposited (without restriction) with the American Type Culture Collection, Washington, D.C. and assigned the collection identification ATCC 21228.

The new alkaline proteinase is easily obtained in good yield in solution in the extracellular fluid of a broth culture and may be isolated in crystalline form by relatively simple crystallization procedure. The proteinase is active under alkaline conditions even at a pH as high as 12.0 with an optimum at about 11.0 and retention of 90% activity at pH 10 to 12. It is stable also at relatively high temperatures, up to about 60–65° C., for 10 minutes, which is a practical working time. It differs in these and other respects from other proteinases.

The alkaline proteinase is useful for disrupting protein bonds under a variety of conditions and purposes. It may be used to break down proteinaceous substances in waste material, e.g., in industrial waste disposal; to remove proteinaceous soil from textile fabrics, e.g., to remove stains especially where foreign proteins bind color or are otherwise difficult to remove; or in the preparation of protein hydrolysate products, e.g., fermentation substrates, casein, for example. It may be used in a proportion of about 0.1 to 1% (by weight), in conventional aqueous or organic solvent media.

The method of producing the new alkaline proteinase comprises culturing the strain of *Bacillus subtilis* ATCC 21228 in a fermentation medium providing a source of complex carbonaceous and nitrogenous materials, preferably digests of animal or plant proteins, such as polypeptone, and extracts of animal and plant proteinaceous materials, exemplified by fish meal or soybean meal extracts. Preferably, a bouillon medium, containing polypeptone, fish meal extract, sodium chloride, and soybean extract is used. The incorporation of 8–12% dextrinized starch enhances the enzyme titre 25-fold.

Aerobic conditions are required for growth and enzyme production. A temperature of 30° to 33° C. for about 48 to 96 hours may be used. In the simplest type of recovery procedure, cells and other solids are separated from the broth and proteinaceous materials, including enzyme, and precipitated by adjustment of the pH of the supernatant to 9.0 to 10 with 10% ammonium hydroxide, and adding solid ammonium sulfate to the 50% saturation point. The whole is allowed to stand at 5° C. for about 16 hours. The precipitated solids are removed from the mother liquor by filtration or centrifugation. The solids are extracted with borate buffer No. 2 (the preparation of buffers is described at the end of the examples) about $\frac{1}{10}$ the volume of the original broth, and brought to pH 8.5–9.5 with 10% ammonium hydroxide. The enzyme in solution is separated from inactive solids by centrifugation at 14,000×G. The supernatant is allowed to stand for one to two hours at room temperature, and then placed at 5° C. for about 16 hours. Crystals of enzyme are collected and washed with buffer No. 2. The crude crystals so obtained may be dried in a vacuum desiccator and used as such, or may be purified further as follows.

Simple recrystallization involves dissolving the crystals in buffer No. 2 adjusted to pH 10–12 with 5% ammonium hydroxide. Ammonia gas is allowed to evaporate for 3–5 hours at room temperature. The removal of ammonia gas may be accelerated by subjecting the solution to reduced pressure, as in a vacuum desiccator. After refrigeration to 5° C., crystals are obtained.

More highly purified material may be obtained by dissolving crude crystals in buffer No. 2 adjusted to pH 10–12 with 5% ammonium hydroxide, adding solid ammonium sulfate to the 50% saturation point, and cooking to 5° C. and holding for 3–4 hours. The precipitate is dissolved in as small a volume as possible of buffer No. 2 brought to pH 9–12 with 5% ammonium hydroxide, and as such is passed through a Sephadex G–75 or Sephadex G–100 column. Active material is eluted from the column with the same buffer at pH 9–12. Active fractions are allowed to stand at room temperature for 1 to 3 hours, and then refrigerated to 5° C. and held for 24 hours. Crystals are obtained.

The highly purified material is most stable when held at 5° C. in contact with the final mother liquor buffer.

The highly purified proteinase appears homogeneous in the effluent from a 2.5 x 34 cm. Sephadex G–100 column. The activity peak and protein peak coincide exactly, each is a single peak, and both are symmetrical with most of the activity in the 90th to 120th ml. of effluent.

The major component in purified enzyme has a sedimentation value of 4.6, corresponding to a molecular weight of about 60,000.

EXAMPLE 1

*Bacillus subtilis* var. SO–4 (ATCC 21228) is isolated from soybeans by a conventional streaking procedure and maintained on bouillon agar slants.

A 500 ml. shaking flask containing 100 ml. of a solution of fish meal extract 1.0%, polypeptone 1.0%, and sodium chloride 0.3% in distilled water is adjusted to pH 7.0–7.2 and inoculated with a platinum wire loop of a bouillon agar slant culture of Bacillus subtilis var. SO–4 (ATCC 21228). The flask is cultured at 30° C. overnight with shaking.

One ml. is transferred from this culture to each of sixty 500 ml. shaking flasks containing 100 ml. of the same medium. The cultures are shaken at 30° for 18–22 hours. At the conclusion of this period the broth is separated by centrifuging. The supernatant is then pooled (about 6 liters). This liquid, when assayed by the procedures described later, shows 4.0 units per ml. of proteinase activity and a protein concentration of 20.5/ml.=280 m$\mu$ (O.D.); total activity=24,000 units.

To the 6 liters of solution is added ammonium sulfate to 80% of saturation and stored in the refrigerator overnight. This is then centrifuged and the supernatant liquid is discarded. The precipitate is dissolved with borate buffer No. 2 at pH 8.2 (about 600 ml.) and the pH of the solution is adjusted to pH 8.2 with 2% ammonium hydroxide solution. Ammonium sulfate is added to 20% of saturation and the solution is stirred overnight in the refrigerator.

The mixture is centrifuged and the precipitate is discarded. Ammonium sulfate is again added to 45% of saturation and the solution is stirred overnight in the refrigerator. The mixture is centrifuged and the precipitate is dissolved with borate buffer No. 2 at pH 8.2. The pH of the solution is adjusted to about pH 8.2 with 2% ammonium hydroxide solution. This is centrifuged and the precipitate is discarded. The supernatant liquid comprising about 50 ml. and having an activity of 22770 units is then chromatographed by passing through a 2.5 x 34 cm. column containing Sephadex G–100 (synthetic derivative of dextran, supplied by Pharmacia Fine Chemicals Inc., Piscataway, New Jersey) buffered with 1/8 borate buffer No. 1 at pH 8.2. About 6 to 7 ml. of the solution is passed through at a time, the flow rate being about 30–40 ml./hour. The material is eluted with 1/8 borate buffer No. 1 at pH 8.2. Thirty-two fractions of about 5 ml. each are collected and active fractions 18 to 25 are pooled, kept at room temperature about one hour, then stored in the refrigerator overnight. The crystals which have formed are collected, washed with distilled water, filtered and dried in a vacuum desiccator. These crystals of alkaline proteinase product may be used as such or further purified by recrystallation.

The supernatant liquid remaining after separation of the crystals are recycled for recovery of additional product. This solution is treated with ammonium sulfate to 20% of saturation, cooled, centrifuged, the precipitate is discarded, the supernatant is treated with ammonium sulfate to 45% of saturation, cooled, centrifuged, the supernatant is discarded, the precipitate is dissolved with borate buffer No. 2 and then chromatographed on a Sephadex G–100 column all as described previously.

The crude crystals (500 mg.) thus obtained are recrystallized by dissolving with borate buffer No. 2 at pH 8.2 and adding dropwise 2% ammonia solution. The mixture is centrifuged and the approximately 80 ml. of supernatant liquid collected are condensed in a vacuum pump at about 20–30° C. to evaporate the ammonia. The solution collected (about 40 ml.) is stored overnight in the refrigerator. The crystals which have formed are collected and again recrystallized in the same manner.

Additional product crystals may be obtained from the supernatant by adding ammonium sulfate to 50% of saturation, centrifuging and dissolving the precipitate with borate buffer No. 2 at pH 8.2. The solution is then passed through a 2.5 x 9.5 cm. Sephadex G–100 column as described above and collecting fractions 7 to 9.

EXAMPLE 2

A culture of the organism Bacillus subtilis SO–4 (ATCC No. 21228) bouillon agar (1% polypeptone, 1% fish meal extract, 0.3% sodium chloride, and 2% agar-agar, adjusted to pH 6.8–7.2) is used to inoculate 100 ml. of a bouillon-soybean extract medium (a medium as described above but containing no agar and with 5 ml./100 ml. of a special soybean extract prepared by extracting 10 g. of soybean residue with 100 ml. boiling water for 2 hours) contained in a 500 ml. shaking flask. The medium so inoculated is shaken mechanically (reciprocating, 125–130 cycles/min.) at 30–33° C. for 16–20 hours. One to two ml. portions are used to inoculate each of sixty shaking flasks, each containing 100 ml. of the bouillon medium supplemented with 8% dextrinized starch. The newly inoculated flasks are incubated as was the first flask but for 96 hours. A proteinase activity of 27.5/ml. of broth is obtained. This represents 5–5.2 g. of proteinase/liter, or about 30 g. of proteinase in the six liters of broth.

The contents of the flasks are pooled, the cells and other solids are separated by centrifugation, and the supernatant is adjusted to pH 9.0–10.0 with 10% ammonium hydroxide. Ammonium sulfate (about 380 g./liter) is added to the 50% saturation point. The pH is readjusted to 9–9.5 with ammonium hydroxide, and placed at 5° C. for 16 hours.

The solids that precipitate are collected, the supernatant is discarded, and the solids are extracted with borate buffer No. 2 (1/10 Politzach No. 1). An amount of buffer approximately 1/10 of the original broth volume is used. The pH is made 8.5–9.5 with 10% ammonium hydroxide. The slurry is centrifuged at 14,000×G for 10 minutes.

The supernatant is allowed to stand 1–2 hours at room temperature, and then placed at 5° C. for 16 hours. Crystals form at this stage. The crystals are collected, washed with borate buffer No. 2, and dried by lyophilization or in a vacuum desiccator.

This material is recrystallized by the procedure of Example 1.

The alkaline proteinase has the following amino acid analysis.

TABLE I.—QUANTITATIVE AMINO ACID ANALYSIS OF A TWENTY-FOUR HOUR ACID HYDROLYZATE

| Amino acid | Relative molar ratios | |
|---|---|---|
| | Found | Nearest integer |
| Lysine | 8.64 | 9 |
| Histidine | 6.19 | 6 |
| Arginine | 4.17 | 4 |
| Aspartic acid | 25.8 | 26 |
| Threonine [1] | 19.3 | 19 |
| Serine [1] | 38.9 | 39 |
| Glutamic acid | 15.0 | 15 |
| Proline | 12.8 | 13 |
| Glycine | 33.5 | 33 |
| Alanine | 35.0 | 35 |
| Valine [2] | 26.1 | 28 |
| Methionine | 3.92 | 4 |
| Isoleucine | 14.9 | 16 |
| Leucine [2] | 15.0 | 15 |
| Tyrosine [1] | 12.3 | 12 |
| Phenylalanine | 2.70 | 3 |
| Tryptophane | [3] | [3] |

[1] Threonine and tyrosine corrected by 5%, serine by 10%.
[2] Valine corrected by 2 residues, isoleucine by 1 on the basis of 72-hour hydrolysis results with similar proteins.
[3] Not determined.

The alkaline proteinase is active at a pH of 7.0 to 12.0, with the optimum pH at 11.0, when tested with milk casein (1%) for 10 minutes at 37° C. and using borate buffer No. 1, M/20 $Na_2B_4O_7$-M/20 $Na_2CO_3$ buffer, or veronal buffer (M/10 peronal, M/10 HCl).

The optimum temperature is 60° C. when tested with milk casein for ten minutes at pH 8.5 and pH 10.0, displaying 100% activity.

The material is stable at pH 8.0–11.0 showing no loss in activity at 30° C. for 20 hours when assayed against milk casein (1%) using as buffers McIllvaine citrate (M/10 citric acid, M/5 Na$_2$HPO$_4$), borate buffer No. 1 or carbohydrate buffer (M/20 Na$_2$B$_4$O$_7$, M/20 Na$_2$CO$_3$).

It is thermostable up to 60–65° C. when a borate buffer No. 1 proteinase solution at pH 8.5 is heat treated for 15 minutes, cooled with running tap water then assayed against milk casein for proteinase activity for 10 minutes at pH 8.5 at 37° C.

In the presence of calcium ion (M/250 calcium acetate) the optimum temperature is shifted to 69–72° C. being accompanied by about 240% increase in reaction rate (5 ml.—1% casein borate buffered solution at pH 8.5, 0.1 ml. M/4.2 calcium acetate, 0.8 ml. borate buffer pH 8.5, 0.1 ml. diluted proteinase; 10 minutes pH 8.5).

The effects of nine agents known to activate or inhibit enzymes were tested at M/1000. Proteinase activities in 1% casein solution, 37° C., 30 minutes, were compared in this buffer (M/5 tris-amino-methane, M/10 HCl, pH 7.4) and borate buffer. (M/20 sodium tetraborate, M/5 boric acid, M/20 NaCl, pH 9.0). Copper sulfate enhanced activity at pH 7.4. Mercuric chloride and silver nitrate had no effect. (These three salts were not tested at pH 9.0.) Ethylenediamine-tetraacetic acid, iodoacetic acid, and p-chloromercuribenzoate had no effect at either pH. Cysteine appeared to reduce activity to about 80% at both pH's, whereas ascorbic acid enhanced activity markedly, to 140% of control at pH 7.4 and 190% at pH 9.0.

ASSAY METHODS

Proteinase activity assay

One ml. of enzyme solution, which is diluted with borate buffer No. 1, pH 8.5, is mixed at 30° C. with 5 ml. of 1.0% casein solution containing borate buffer No. 1, pH 8.5. After reaction for 10 minutes at 37° C., 4 ml. of protein precipitation reagent (0.44 M CCl$_3$COOH) is added to the reaction mixture and after standing at 37° C. for about 20 minutes, is filtered.

Five ml. of 0.44 M sodium carbonate solution are added to one ml. of the filtrate, then 1 ml. of Folin phenol reagent (5 fold diluted is added and the solution is permitted to stand at 37° C. for 20 minutes. The optical density of the solution is read at 660 m$\mu$. The reading is corrected for the value of blanks in which enzyme solutions are mixed with the precipitating agent prior to addition of substrate.

The proteinase activity per ml. is the optical density $\times 10$.

Protein concentration

The protein concentration per ml. corresponds to the optical density at 280 m$\mu$ of the enzyme solution diluted with borate buffer No. 1 at pH 8.5.

Borate buffer No. 1 (Politzach borate buffer pH 8.2)

This buffer is prepared from 1 part M/5 boric acid, 1 part M/20 sodium chloride and 1 part M/20 sodium borate.

Buffer No. 2

This buffer is prepared by diluting Buffer No. 1 with 9 parts (by volume) of distilled water.

I claim:

1. Alkaline proteinase obtained from *Bacillus subtilis* ATCC 21228 having a molecular weight of about 60,000, a relative molar ratio of amino acids as follows: lysine, 9; histidine, 6; arginine, 4; aspartic acid, 26; threonine, 19; serine, 39; glutamic acid, 15; proline, 13; glycine, 33; alanine, 35; valine, 28; methionine, 4; isoleucine, 16; leucine, 15; tyrosine, 12; and phenylalanine, 3; characterized by stability at a pH of 8 to 12 and thermostability up to a temperature of about 72° C., with an optimum pH of about 11 at about 60 to 65° C., the optimum temperature being about 60° C. when tested with milk casein at pH 8.5 and pH 10.0 and shifting in the presence of calcium ion to about 69 to 72° C. accompanied by increase in reaction rate, enhanced activity in the presence of copper sulfate at about pH 7.4 and markedly enhanced activity in the presence of ascorbic acid at pH 7.4 to 9.0.

2. A process for producing the alkaline proteinase of claim 1 which comprises culturing *Bacillus subtilis* ATCC 21228 in an aqueous nutrient medium under aerobic conditions until substantial alkaline proteinase activity is imparted to the extracellular fluid of the broth culture.

References Cited

Tsuru et al., Agricultural and Biological Chemistry (Japan), vol. 30, No. 12, pp. 1261–1268 (1966).

LIONEL M. SHAPIRO, Primary Examiner

U.S. Cl. X.R.

195—66, 2